No. 751,635. Patented February 9, 1904.

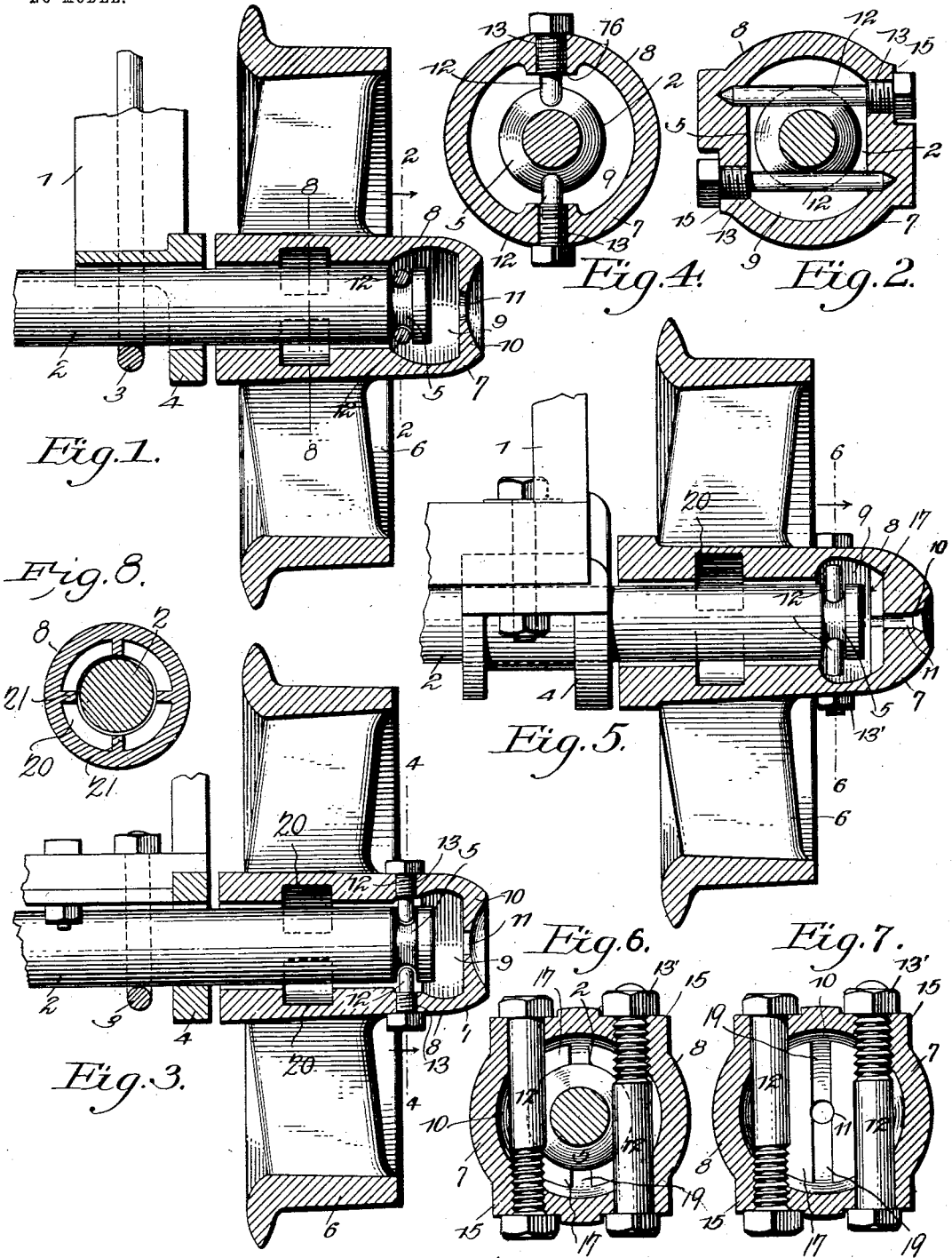

UNITED STATES PATENT OFFICE.

CHARLES JACOB GUSTAFSON, OF CHATTANOOGA, TENNESSEE.

SELF-LUBRICATING WHEEL FOR CARS, &c.

SPECIFICATION forming part of Letters Patent No. 751,635, dated February 9, 1904.

Application filed May 19, 1903. Serial No. 157,862. (No model.)

*To all whom it may concern:*

Be it known that I, CHARLES JACOB GUSTAFSON, a citizen of the United States, residing at Chattanooga, in the county of Hamilton and State of Tennessee, have invented a new and useful Improvement in Self-Lubricating Wheels for Cars, &c., of which the following is a specification.

My invention relates to car-wheels, and is especially directed to that class of devices in which the wheels are mounted for rotation upon the axle, and has for its objects to produce a device of this character which will be simple of construction, efficient in operation, one in which the wheel will be self-lubricating, and one in which the wheel will be securely locked upon the axle to prevent its escape therefrom and at the same time be free for rotation and for a slight lateral play.

To these ends the invention comprises the novel details of construction and combination of parts more fully hereinafter described.

In the accompanying drawings, Figure 1 is a vertical sectional elevation of a wheel and axle constructed and assembled in accordance with my invention. Fig. 2 is a transverse section on the line 2 2 of Fig. 1 as viewed in the direction of the arrow. Fig. 3 is a vertical sectional elevation of a slightly-modified form. Fig. 4 is a transverse section on the line 4 4 of Fig. 3 as viewed in the direction of the arrow. Fig. 5 is a view similar to Fig. 3 of a second modification of the invention. Fig. 6 is a transverse section on the line 6 6 of Fig. 5 as viewed in the direction of the arrow. Fig. 7 is a similar view with the axle removed. Fig. 8 is a detail view on the line 8 8 of Fig. 1.

Referring to the drawings, 1 indicates a portion of the car body or frame of the usual or any desired construction; 2, an axle which is secured thereto preferably by means of a U-shaped clip-bolt 3, which also maintains in position upon the axle a collar 4, the purpose of which will presently appear.

The axle 2 is provided adjacent to its outer end with a peripheral semicircular groove 5, and mounted for rotation upon the axle is a wheel 6, having a hub 7, which is provided with an integral extended portion 8, which is cored out to form an internal oil-chamber 9, into which the end of the axle 2 extends, the chamber being closed beyond the axle by a wall 10, which is formed integral with the hub. As shown in Figs. 1 and 5, I form through the wall 10 an orifice 11, through which oil may be introduced into the chamber 9; but I have made other provision for the introduction of oil into the chamber whereby the orifice 11 may be dispensed with or serve only as an auxiliary means for this purpose, as will be more fully hereinafter described.

The wheel is locked upon the axle 2 by means of a pair of pins or bolts 12, which extend through the side walls of the chamber 9 in engagement with the groove 5 at diametrically opposite points. In this connection it is to be noted that the pins are shaped to conform to the curvature of the groove in cross-section and that they are of a size so proportioned relative to the groove that the wheel may have a certain amount of lateral play longitudinally of the axle, whereby the latter will be more evenly worn. It is also to be noted that owing to the groove 5 being of semicircular form in cross-section and the pins 12 being shaped to conform thereto free rotation of the wheel upon the axle is insured and friction between the parts is reduced to a minimum.

In Fig. 1 the pins 12 are shown as extended entirely through the chamber 9 and as engaging at a point between their ends with the groove 5 in the axle. The pins are also shown in this connection as being in threaded engagement, as at 13, with the walls of the chamber at a point adjacent to the outer headed ends of the pins, while the inner ends of the pins extend loosely into sockets formed for their reception upon the inner faces of said chamber-walls.

In Figs. 3 and 4 the pins 12 are shown as tapped through the walls of the chamber 9 at diametrically opposite points and as engaging at their inner ends with the groove 5, said ends of the pins being rounded to conform to the contour of the groove.

In Figs. 5, 6, and 7 the pins 12 extend entirely through the walls of the chamber and engage at a point between their ends with the groove 5, the pins in this instance being in the form of bolts, to which are applied removable nuts 13', the nutted ends of the bolts being in threaded engagement with the walls of the chamber and having the nuts applied thereto and jammed against the outer face of the chamber - wall, thus locking the nuts against accidental escape. These bolts may also be applied to the chamber 9 through plain, smooth, or unthreaded holes, the threaded portion engaging only with a nut or jamnuts, the end of the bolt being burred, split, or riveted to prevent losing the nut. Attention is here directed to the fact that in all the forms shown the pins 12 are readily removable, which construction admits of the oil-orifice 11 being omitted and oil being supplied to the chamber 9 by removing one of the pins. It is also to be noted that the walls of the chamber 9 are provided with lateral enlargements, forming thickened portions through which the pins 12 pass, these enlargements being shown at 15 in Figs. 2, 6, and 7 as formed upon the outer faces of the chamber-walls and at 16 in Figs. 3 and 4 as formed upon the inner face of said walls.

As before stated, the wheel 6 is susceptible of a certain amount of lateral play in a direction longitudinally of the axle, and the collar 4 is designed to receive the end thrust of the hub due to this movement. I have, however, in Figs. 5, 6, and 7 made provision for the end of the axle receiving in part the thrust due to such movement of the wheel and in attaining this object have provided the chamber 9 upon the inner face of its wall 10 with a web 17, which contacts with the outer end of the axle, and have provided said web with a central groove 19, which communicates with the oil-opening 11 and permits ready introduction of oil through the latter into the chamber 9 even though the web 17 may be in contact with the end of the axle, it being understood, of course, that if the groove 19 were omitted and the parts were in said position the orifice 11 would be closed.

20 indicates a supplemental oil-chamber which is formed upon the inner face of the hub 7 at a point adjacent to its longitudinal center, the chamber being formed by coring out the metal of the hub. The chamber 20 is provided with radiating ribs or partitions 21, the outer edges of which are flush with the inner wall of the hub and bear upon the axle for distributing the lubricant uniformly thereover and at the same time preventing the uneven wearing of the axle, which would follow if the ribs did not bear thereon, owing to the metal of the hub at the ends of the chamber wearing the axle and forming a collar upon the unworn portion thereof beneath the chamber. In other words, the ribs bearing upon the axle insure a uniform wearing of the same and entirely obviate the above-mentioned objectionable feature which would otherwise follow.

From the foregoing it will be seen that I produce a simple and efficient device which is admirably adapted for the attainment of the ends in view; but it is to be understood that I do not limit myself to the precise details herein shown and described, inasmuch as minor changes may be made in the form, proportions, and precise manner of assemblage of the parts without departing from the spirit of my invention.

Having thus described my invention, what I claim is—

1. The combination with a car-axle having a peripheral groove formed adjacent to its outer end, of a wheel-hub mounted for rotation upon the axle and having an integral portion extended beyond the outer end of the axle and provided with an internal oil-chamber, said chamber having its side walls provided with lateral enlargements forming thickened portions and a pair of pins or bolts extended through the thickened portions of the walls of the chamber in threaded engagement therewith and engaging the axle-groove.

2. The combination with a car-axle having a peripheral groove formed adjacent to its outer end, of a wheel-hub mounted for rotation upon the axle and having an integral portion extended beyond the ends of the same and provided with an internal oil-chamber, the wall of the chamber being provided opposite the end of the axle with an oil-inlet orifice, a web formed upon the inner face of said wall and provided with a groove communicating with said orifice, and a pair of pins or bolts extended through the walls of the chamber in engagement with the axle-groove, said pins being of a size relative to the groove to permit movement of the hub longitudinally of the axle.

In testimony that I claim the foregoing as my own I have hereto affixed my signature in the presence of two witnesses.

CHARLES JACOB GUSTAFSON.

Witnesses:
JNO. S. SHEPPARD,
FERNAND LACROIX.